March 13, 1951     D. L. HINGS     2,545,232

WAVE INVERTER

Filed Aug. 6, 1945

INVENTOR
Donald L. Hings
BY Standling and Frost
ATTORNEYS.

Patented Mar. 13, 1951

2,545,232

UNITED STATES PATENT OFFICE 2,545,232

WAVE INVERTER

Donald L. Hings, Ottawa, Ontario, Canada, assignor, by mesne assignments, to Cornell-Dubilier Electric Corporation, South Plainfield, N. J., a corporation of Delaware Application August 6, 1945, Serial No. 609,262
In Canada July 20, 1945

6 Claims. (Cl. 250—20)

My invention relates in general to wave inverters and more particularly to a wave inverter adapted to construct or generate a secondary modulated carrier wave which is the inverse to an original modulated carrier wave.

An object of my invention is to provide for subtracting the voltage of a modulated carrier wave from the voltage of a secondary source comprising an alternating current having a frequency within the carrier spectrum whereby the resultant voltage produces a wave which is inverse to the modulated carrier wave.

Another object of my invention is to provide for controlling the detection operation performed in detecting a modulated carrier wave in such a manner that the detector operation is influenced by a secondary voltage source having a frequency within the spectrum range of the carrier wave whereby a resultant voltage is produced for giving a secondary wave form that is the inverse of the original modulated carrier wave.

Another object of my invention is to provide for controlling the operation of a duo-diode rectifier that is adapted to detect a modulated carrier wave in which the duo-diode rectifier is preferably subjected to a square wave voltage having an amplitude greater than the maximum amplitude of the modulated carrier wave and having a frequency lying within the spectrum of the carrier wave, whereby a resultant voltage is produced that generates a wave which is the inverse to the modulated carrier wave.

Another object of my invention is the provision of a circuit having a first carrier wave source and a second carrier wave source in which the second carrier wave source is of a lower frequency and having a substantially square top wave, taken in combination with means for subtracting the voltage of the first carrier wave source from the second carrier wave source, thereby producing a resultant voltage which generates a wave which has an inverse amplitude to that of the first carrier wave source.

Other objects and a fuller understanding of my invention may be had by referring to the following description and claims, taken in conjunction with the accompanying drawing, in which:

Figure 2:
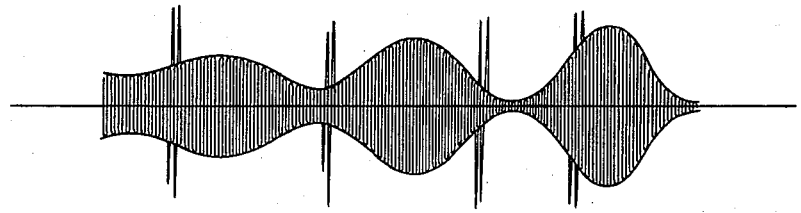
Figure 2 is a wave representation of a modulated carrier wave having superimposed thereon spurious interference waves.
Figure 4:
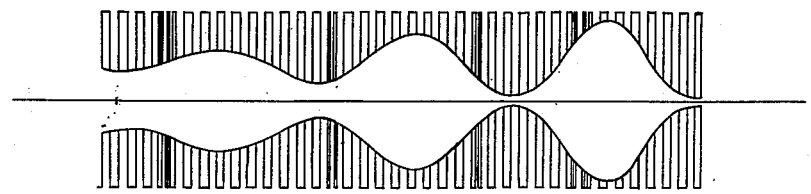
Figure 5:
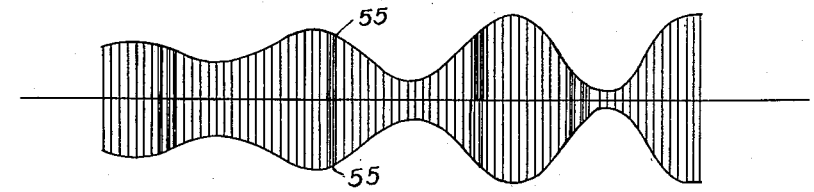

Figure 4 is a wave representation which illustrates the subtraction operation performed in my circuit, the shaded area representing the resultant voltage which appears after the subtraction operation has been performed in my circuit; and Figure 5 illustrates the resultant wave, having an amplitude which is the inverse to the amplitude of the modulated carrier wave of Figure 2 and which is the sum of the two shaded areas in Figure 4.

Figure 1:
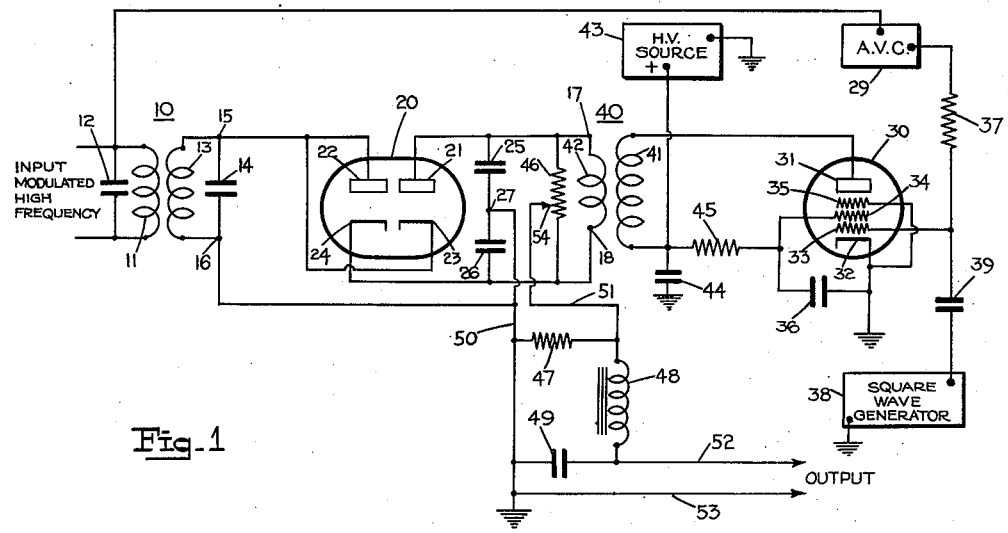
Figure 1 shows a diagrammatic illustration of a circuit embodying the features of my invention.

With reference to Figure 1 of the drawing, the reference character 10 represents a transformer having a primary winding 11 and a secondary winding 13, in which the primary winding is adapted to be energized by incoming modulated carrier waves such as shown in Figure 2 of the drawing. A condenser 12 is connected across the primary winding 11 and constitutes, in combination with the primary winding, a resonant circuit which is tuned substantially to resonance at a frequency equal to the frequency of the incoming carrier waves. Similarly, a condenser 14 is connected across the secondary winding 13 and constitutes, in combination with the secondary winding, a resonant circuit which is tuned substantially to resonance at a frequency equal to the incoming carrier wave frequency. The incoming carrier wave frequency which is supplied to the transformer 10 may be referred to as a first or primary carrier wave source.

In my invention, I provide for subtracting the voltage of the modulated carrier wave of the primary source from the voltage of a secondary carrier wave source which is preferably a square top wave, such as may be provided by a square wave generator illustrated by the block 38 in Figure 1 of the drawing. The square wave generator may be of any suitable type, and I preferably make the frequency of the square wave generator lower than the frequency of the primary source. The square wave generator is regulated by an automatic volume control circuit indicated by the block 29 to have a voltage which is greater than the maximum voltage of the modulated primary carrier wave source.

Figure 3:
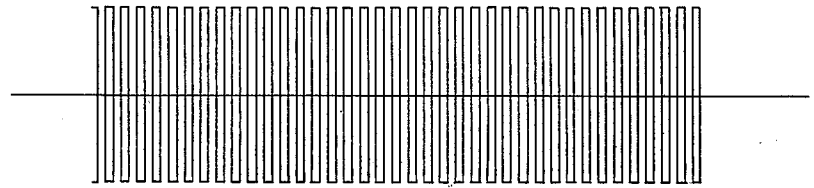
Figure 3 is a wave representation of a second source of carrier waves having a square top amplitude.

The square wave voltage delivered by the square wave generator 38 is illustrated in Figure 3 and is adapted to be amplified by an amplifier tube 30 having a plate 31, a cathode 32, a control grid 33, a screen grid 34 and a suppressor grid 35. The control grid 33 is coupled to the square wave generator 38 by a coupling condenser 39. The excitation of the control grid 33 may also be regulated by an automatic volume control circuit designated by the reference character 29. The automatic volume control circuit 29 may have a normal time constant, for example, in the order of one-quarter second. The resistor 37 which inter-connects the control grid 33 and the automatic control volume 29 is a grid resistor. The amplitude of the voltage of the secondary carrier source expands and contracts under the action of the automatic volume control which is responsive to the primary carrier power. Thus, as the primary carrier power would increase, the automatic volume control circuit 29 causes the amplitude of the secondary carrier wave to increase. Similarly, as the power of the primary carrier source decreases the amplitude of the secondary carrier source is caused to decrease accordingly. The screen grid 34 is by-passed to the cathode for radio frequency through a by-pass condenser 36. The suppressor grid 35 is directly connected to the cathode 32 of the amplifier tube. The square wave voltage supplied by the square wave generator 38 is preferably amplified and regulated by the automatic volume control circuit 29 to a voltage which is slightly greater than the maximum amplitude of the modulated primary carrier wave which is impressed upon the transformer 10. The resistor 45 is a screen dropping resistor and is connected to the high voltage source 43. The plate 31 of the amplifier tube 30 is connected to the upper end of a primary winding 41 of a coupling transformer 40. The lower end of the primary winding is connected to ground for carrier wave frequency through the coupling condenser 44.

I provide for subtracting the voltage of the modulated carrier wave in the transformer 10 from the secondary carrier wave voltage in the transformer 40 by means of a duo-diode rectifier 20 having a detecting circuit, whereby the resultant voltage generates a wave such as shown in Figure 5 of the drawing. The duo-diode rectifier 20 comprises two plates 21 and 22 and two cathodes 23 and 24. The plate 22 and the cathode 23 are connected to the upper terminal 15 of the secondary winding 13 of the transformer 10. The plate 21 is connected to the upper terminal 17 of the secondary winding 42 of the transformer 40. The cathode 24 is connected to the lower terminal 18 of the secondary winding 42 of the coupling transformer 40. Connected in parallel across the secondary winding 42 is an adjustable balancing resistor 46. Connected in parallel with the balancing resistor 46 are two condensers 25 and 26 connected in series with respect to each other. The lower terminal 16 of the secondary winding 13 of the transformer 10 is connected to a tap 27 which is intermediate the two condensers 25 and 26. The resultant voltage from the tube 20 appears across the two conductors 50 and 51. The resistor 47 is a detector load resistor for the high impedance path of the detector circuit. The resultant output voltage is supplied to a series resonant circuit comprising an inductance 48 and a condenser 49 which is tuned substantially to resonance at a frequency substantially equal to the frequency of the secondary carrier wave source from the square wave generator 38. The output resultant voltage appears across the conductors 52 and 53 and is shown by the wave form of Figure 5. The secondary winding 42 is a low impedance winding, and the condenser 49 is a low impedance condenser. The condensers 25 and 26 by-pass the frequency of the primary carrier wave source and form the return circuit for the two diodes of the tube 20 to ground.

The duo-diode tube 20 operates as a gate detector and alternately is rendered conducting by one square wave potential across the secondary 42 of the transformer 40 and rendered non-conducting by the opposite square wave potential. When the tube 20 is rendered conducting, a subtraction operation takes place which subtracts the carrier wave voltage in the primary source of the transformer 10 from the carrier wave voltage in the transformer 40. When the tube becomes conducting, a resultant carrier wave voltage appears across the conductors 50 and 51, which voltage, when applied to the series resonant circuit 48 and 49, produces a voltage across the condenser 49 which may be represented by the curve in Figure 5.

My detector circuit comprises two halves, one for each of the half cycles of the carrier wave source. For one of the half cycles of the carrier wave source, the detector circuit may be traced as follows: beginning with the adjustable pointer 54, the circuit extends through the upper half of the resistor 46, the plate 21 and the cathode 23 of the tube 20, the resonant circuit including the condenser 14 and the secondary winding 13 of the transformer 10, and the combination of the load resistor 47, the output load condenser 49 and the inductance 48 which is connected to the adjustable pointer 54. For the other half cycle of the carrier wave source, the detector circuit may be traced as follows: beginning at the adjustable pointer 54, the circuit extends through the lower half of the resistor 46, the cathode 24 and the plate 22 of the tube 20, the resonant circuit including the condenser 14 and the secondary winding 13 of the transformer 10, and the combination of the load resistor 47, the output load condenser 49, and the inductance element 48 which is connected to the adjustable pointer 54. Inasmuch as the detector circuits traced above have voltages therein both from the primary carrier wave source in the transformer 10 and from the secondary carrier wave source in the transformer 40, the tube 20 operates as a gate detector for detecting a differential voltage, which differential voltage is illustrated by the two shaded areas in Figure 4 of the drawing. When the two shaded areas are added together, which is the result of the voltages in the two detector circuits above traced, the inverse modulated wave as shown in Figure 5 is obtained. Both halves of the primary input carrier wave frequencies are by-passed to ground through the condensers 25 and 26 respectively. The secondary winding 42 for the transformer 40 is untuned and represents a low impedance for high frequencies such as for the frequencies of both the primary carrier wave source and the secondary carrier wave source. The secondary winding 13 of the transformer 10 and the condenser 14 which is connected there-across is tuned substantially to resonance at a frequency of the incoming primary carrier wave source and thus represents a high impedance to the incoming primary carrier wave frequency. However, the circuit comprising the secondary winding 13 and the condenser 14 is not resonant to the frequency of the secondary source from the square wave generator 38 and thus represents a low impedance to the secondary carrier wave frequency. The condenser 49 and the inductance element 48 are tuned substantially to resonance at a frequency of the secondary carrier wave source and thus represent a series resonant circuit having a low impedance to the secondary carrier wave energy. The peak power of the secondary carrier wave source is thus not influenced by the primary carrier wave source. For a predetermined setting of the automatic volume control circuit 29, the voltage of the secondary source is maintained relatively constant and this relatively constant voltage is substantially unaffected by the modulation or peak noises appearing in the primary carrier wave source applied to the transformer 10. This substantially non-interference action appears to result from the fact that the secondary winding 42 represents a low impedance to the incoming primary carrier wave frequency in the transformer 10, plus the fact that the secondary winding 13 and the condenser 14 represent a low impedance to the frequency of the secondary carrier wave source. In other words, the voltage of the primary carrier wave source and the voltage of the secondary carrier wave source may be characterized as being both solid or stable and thus the detector tube 20, which is subjected to both of these voltages, detects, gates and limits the differential voltages of the two carrier wave sources, including the spurious interference waves as shown in Figure 2 which have an amplitude greater than the amplitude of the modulated carrier wave source. The spurious interference wave peaks are, however, limited by the amplitude of the secondary carrier wave source, such as shown in Figure 4 which represents a theoretical illustration of the detecting, gating and limiting action of the tube. The wave as shown in Figure 5 is the actual wave and represents the voltage as one can discern upon an oscilloscope with the terminals connected across the output conductors 51 and 53. The upper half and the lower half of Figure 5 represent the energy detected, gated and limited by the two detector circuits hereinbefore traced. In Figure 5, it is observed that the noise energy, so to speak, cuts a slot or depression as at 55 into the upper and lower envelopes of Figure 5. From the standpoint of ordinary reception, the two slots or depressions 55 are directly opposite from each other and of equal value, so that, when the envelope is received upon a receiver, the operator or the listener cannot hear any appreciable noise disturbance to distort the intelligence. Thus, in my invention, the spurious interference wave energies as found in ordinary reception are limited and inverted, so that in my circuit the intelligence controls the noise, instead of the noise controlling the intelligence.

Although I have shown and described my invention with a certain degree of particularity, it is understood that changes may be made therein without departing from the spirit of the invention which are included within the scope of the claims hereinafter set forth.

I claim as my invention:

1. A wave inverter system comprising, in combination, a first transformer adapted to be energized by a primary modulated carrier wave source, said transformer having a secondary winding, a condenser connected across the secondary winding and forming a resonant circuit tuned substantially to resonance at a frequency equal to the frequency of the primary carrier wave source, a second transformer adapted to be energized by a secondary carrier wave source having a frequency less than the frequency of the primary carrier wave source, said second transformer having a secondary winding representing a low impedance for the frequencies of both the primary and the secondary carrier wave sources, the secondary winding of the first transformer and the condenser which is connected there-across representing a low impedance to the secondary carrier wave, a diode detector having a detector circuit connected between the secondary winding of the first transformer and the secondary winding of the second transformer, circuit means for causing said secondary carrier wave source to alternately render said diode detector conducting and non-conducting at the frequency of said secondary carrier wave, said diode detector detecting, gating and limiting the differential voltage between the two carrier wave sources when said diode detector is rendered conducting, an output circuit including at least a condenser connected in the detector circuit of the diode detector, and means responsive to the power of the primary carrier wave source for varying the amplitude of the secondary carrier wave source.

2. A wave inverter system comprising, in combination, a first transformer adapted to be energized by a primary modulated carrier wave source, said transformer having a secondary winding, a condenser connected across the secondary winding and forming a resonant circuit tuned substantially to resonance at a frequency equal to the frequency of the primary carrier wave source, a second transformer adapted to be energized by a secondary carrier wave source having a frequency less than the frequency of the primary wave source, said second transformer having a secondary winding representing a low impedance for the frequencies of both the primary and the secondary carrier wave sources, the secondary winding of the first transformer and the condenser which is connected there-across representing a low impedance to the secondary carrier wave, a diode detector having a detector circuit connected between the secondary winding of the first transformer and the secondary winding of the second transformer, circuit means for causing said secondary carrier wave source to alternately render said diode detector conducting and non-conducting at the frequency of said secondary carrier wave, said diode detector detecting, gating and limiting the differential voltage between the two carrier wave sources when said diode detector is rendered conducting, an output circuit including at least a condenser connected in the detector circuit of the diode detector, and means responsive to the power of the primary carrier wave source for varying the amplitude of the secondary carrier wave source, said secondary carrier wave source comprising a square top wave.

3. A communication system including carrier wave input means having first and second ends, a source of injected waves having a greater maximum amplitude and a lower frequency than said carrier waves, injector input means for said injected waves, said injector input means having first and second ends, first rectifier means having first electron emitting means and first electron receiving means, second rectifier means having second electron emitting means and second electron receiving means, output circuit means connected between said second end of said carrier wave input means and said second electron receiving means, means for connecting said first end of said carrier wave input means to both said first electron receiving means and to said second electron emitting means, means for connecting said second electron receiving means and said first electron emitting means, respectively, to said first and second ends of said injector input means, and carrier wave bypass means for connecting said first and second ends of said injector input means to said second end of said carrier wave input means.

4. A communication system including, a source of modulated carrier waves, antiresonant input means for said modulated carrier waves, said antiresonant input means having first and second ends, a source of injected waves having a greater maximum amplitude and a lower frequency than said carrier waves, injector input means for said injected waves, said injector input means having a first and a second end and a midtap, output circuit means connected between said second end of said antiresonant input means and said midtap, a first diode rectifier having a first cathode and a first anode, a second diode rectifier having a second cathode and a second anode, connection means for connecting said first end of said antiresonant input means to both said first anode and to said second cathode, connection means for connecting said second anode and said first cathode, respectively, to said first and second ends of said injector input means, and carrier wave bypass means for connecting said first and second ends of said injector input means to said second end of said antiresonant input means.

5. A communication system including, a source of modulated carrier waves, antiresonant input means for said modulated carrier waves, said antiresonant input means having first and second ends, a source of injected waves having a greater maximum amplitude and a lower frequency than said carrier waves, untuned input means for said injected waves, said untuned input means having a first and a second end and a midtap, output circuit means connected between said second end of said antiresonant input means and said midtap, a first diode rectifier having a first cathode and a first anode, a second diode rectifier having a second cathode and a second anode, connection means for connecting said first end of said antiresonant input means to both said first anode and to said second cathode, connection means for connecting said second anode and said first cathode, respectively, to said first and second ends of said untuned input means, and carrier wave bypass means for connecting said first and second ends of said untuned input means to said second end of said antiresonant input means, said output circuit means including a load impedance in parallel with the series combination of an inductive and a capacitive element, said series combination being resonant at the frequency of said injected waves.

6. A first and a second wave input circuit each having first and second ends, a first and a second wave source for energizing, respectively, said first and second wave input circuits, said first wave input circuit being antiresonant substantially at the frequency of said first wave source, said second wave input circuit being untuned, a series resonant output circuit being resonant substantially at the frequency of said second wave source, a first and second diode, said first diode being connected between said first end of said first wave input circuit and said second end of said second wave input circuit, said second diode being connected between said first end of said first wave input circuit and said first end of said second wave input circuit, said second wave input circuit having a midtap, and connection means for connecting said output circuit between said second end of said first wave input circuit and said midtap.

DONALD L. HINGS.

REFERENCES CITED

The following references are of record in the file of this patent:

UNITED STATES PATENTS

| Number | Name | Date |
|---|---|---|
| 1,376,679 | Curtis | May 3, 1921 |
| 1,418,285 | Carson | June 6, 1922 |
| 2,099,311 | Nicholson | Nov. 16, 1937 |
| 2,103,878 | Thompson | Dec. 28, 1937 |
| 2,166,995 | Koch | July 25, 1939 |
| 2,173,925 | Tuxen | Sept. 26, 1939 |
| 2,214,929 | Koschmeider | Sept. 17, 1940 |
| 2,221,087 | Foster | Nov. 12, 1940 |
| 2,239,560 | Herold | Apr. 22, 1941 |
| 2,267,732 | Hansell | Dec. 30, 1941 |
| 2,363,288 | Bell | Nov. 21, 1944 |
| 2,441,598 | Robertson | May 18, 1948 |
| 2,446,188 | Miller, Jr. | Aug. 3, 1948 |